UNITED STATES PATENT OFFICE.

ALBIN HALLER, OF PARIS, FRANCE, ASSIGNOR TO SOCIETE FABRIQUES DE PRODUITS CHIMIQUES DE THANN ET DE MULHOUSE, OF MULHOUSE, (ALSACE,) FRANCE.

MANUFACTURE OF BORNEOL.

1,415,340.   Specification of Letters Patent.   Patented May 9, 1922.

No Drawing.   Application filed January 30, 1920.   Serial No. 355,217.

*To all whom it may concern:*

Be it known that I, ALBIN HALLER, a citizen of the Republic of France, residing in Paris, Seine, France, have invented certain new and useful Improvements in the Manufacture of Borneol, of which the following is a description.

It is known that the reaction of organic acids on pinene yields isobornyl esters from which isoborneol may be made by hydrolysis. It appears that strong acids, such as oxalic acid and chlorobenzoic acids produce better results than feeble acids do, such as acetic acid or formic acid. Experiments have also been made with phthalic acid, but this gives only a poor yield; 3-nitrophthalic acid gives even a worse yield.

By the present invention tetrachlorophthalic acid is used, whereby a considerably increased yield of esters is obtained and those which are formed are, so to say, almost exclusively the active esters of bornyl; it has not been established, however, that esters of isobornyl are formed at the same time.

This result is surprising and all the less to be foreseen because hitherto the almost exclusive formation of esters of bornyl from pinene has not been observed. Tetrachlorophthalic acid has several advantages; it is cheap; sparingly soluble in water and consequently easily recovered from its soluble salts; practically non-volatile; does not give rise to volatile esters of bornyl so that the excess of terpenes can easily be separated by distillation.

The following example illustrates the manufacture of the di-bornyl esters of tetrachlorophthalic acid from pinene:—

40 kilos of tetrachlorophthalic acid are heated in a reflux apparatus with 160 kilos of crude pinene, while stirring well, for 12 hours at 106—108° C. (internal temperature); after heating for 8 hours the acid has completely dissolved. Heating is continued for 2 hours at 125° C. and the temperature is then slowly raised to 140° C. at which it is maintained for 6 hours. After cooling, the unattacked terpenes (pinenes and dipentenes) are distilled off with steam or in a vacuum, care being taken to separate completely these bodies by gradually raising the temperature to 140° C. The residue from the distillation, when cool, is a mass having the brilliancy of glass and very similar to colophony. It weighs about 75 kilos and consists principally of the di-bornyl-ester of tetrachlorophthalic acid, which by saponification in an alcoholic solution of caustic soda forms borneol.

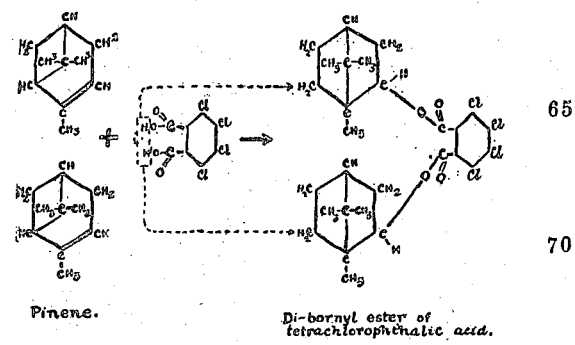

Pinene.   Di-bornyl ester of tetrachlorophthalic acid.

After distilling the alcohol, water is added and the whole well shaken until cold. The precipitated borneol is filtered, ground with water and centrifuged until no longer alkaline.

The tetrachlorophthalic acid is recovered by adding mineral acid to the alkaline solutions.

The borneol is purified by the ordinary methods and is very active if the original pinene was active.

The regenerated hydrocarbons are in part returned to the manufacture, after fractional distillation, or are in part otherwise used.

The yield of pure borneol may be as high as 28 kilos.

In a process which has been described for the preparation of bornyl esters, using polysubstituted organic acids, it is said to be particularly important that the reaction should occur under super-atmospheric pressure in presence of an anhydride of the acid; among derivatives of phthalic acid, only 1:2:3-nitrophthalic acid is named; a mixture of esters of bornyl and isobornyl is obtained.

The process of the present invention differs from that which has been described as aforesaid, in that the operation is not conducted under pressure but in open vessels and that tetrachlorophthalic acid is used in absence of its anhydride; for this latter whether in pure state or mixed with the acid gives poorer results than the acid itself gives.

Furthermore, experiments have shewn that 3-nitrophthalic acid under the conditions of the present process does not yield borneol, and that the regeneration of the 3-nitrophthalic acid, if conditions could be found for producing borneol, presents so much difficulty owing to the high solubility of the acid and the ease with which it decomposes, that industrial manufacture of borneol with its aid would be impossible. The great impurity of the regenerated acid appears to establish that the nitro-group in the 3-nitro-phthalic acid is not without influence on pinene and its derivatives. It may be added that it was impossible to foretell from literature that tetrachlorophthalic acid would give favourable results and this could be established only by systematic experiments.

I claim:—

1. In a process of manufacturing borneol, producing a reaction between pinene and a tetrachlorophthalic acid.

2. As a new product, di-bornyl ester of a tetrachlorophthalic acid.

In witness whereof, I have hereunto signed my name.

ALBIN HALLER